(12) United States Patent
Li

(10) Patent No.: US 7,422,343 B2
(45) Date of Patent: Sep. 9, 2008

(54) ILLUMINATION WIRING ARRANGEMENT FOR OUTDOOR UMBRELLA

(76) Inventor: Wanda Ying Li, 3000 Croddy Way, Santa Ana, CA (US) 92704

( * ) Notice: Subject to any disclaimer, the term of this patent is extended or adjusted under 35 U.S.C. 154(b) by 215 days.

(21) Appl. No.: 11/225,314

(22) Filed: Sep. 12, 2005

(65) Prior Publication Data
US 2007/0058360 A1 Mar. 15, 2007

(51) Int. Cl.
*A45B 3/02* (2006.01)
(52) U.S. Cl. .................. 362/102; 362/577; 362/653; 439/384; 135/16
(58) Field of Classification Search ................. 362/102, 362/577, 23, 295, 652–659, 369; 135/910, 135/15.1, 16, 66; 439/382–385, 140
See application file for complete search history.

(56) References Cited
U.S. PATENT DOCUMENTS

| 5,331,524 | A | * | 7/1994 | Tseng | 362/102 |
| 6,126,293 | A | * | 10/2000 | Wu | 362/102 |
| 6,340,233 | B1 | * | 1/2002 | Shieh | 362/102 |
| 6,341,873 | B1 | * | 1/2002 | Yang | 362/102 |
| 6,598,990 | B2 | * | 7/2003 | Li | 362/102 |
| 7,017,598 | B2 | * | 3/2006 | Nipke | 135/16 |
| 7,111,954 | B1 | * | 9/2006 | Lai | 362/102 |
| 2007/0056617 | A1 | * | 3/2007 | Li | 135/91 |
| 2007/0127231 | A1 | * | 6/2007 | Li | 362/102 |

* cited by examiner

*Primary Examiner*—Sandra L. O'Shea
*Assistant Examiner*—Gunyoung T. Lee
(74) *Attorney, Agent, or Firm*—Raymond Y. Chan; David and Raymond Patent Firm

(57) ABSTRACT

An outdoor umbrella includes an awning, a main frame, an illumination system, and an illumination wiring arrangement. The illumination wiring arrangement includes a first wiring unit including a connector plug provided at a first connector end of a first post of the main frame to electrically connect to the illumination system. The second wiring unit includes a power socket which is electrically extended from a power source and is extended through a second post of the main frame at the second connector end thereof to electrically connect to the connector plug, wherein when the first post is coupled with the second post, the power socket is free to move within the second post to keep intact an electrical connection between the power socket and the connector plug even when vibration occurs at the main frame.

11 Claims, 19 Drawing Sheets

ILLUMINATION WIRING ARRANGEMENT FOR OUTDOOR UMBRELLA

BACKGROUND OF THE PRESENT INVENTION

1. Field of Invention

The present invention relates to an outdoor umbrella, and more particularly to an outdoor umbrella which comprises a illumination wiring arrangement for maintaining a secure electrical supply to an illumination system mounted on the outdoor umbrella.

2. Description of Related Arts

A conventional outdoor umbrella usually comprises an awning, a main supporting frame comprising an awning frame and a central post frame, and an illumination system supported on the main supporting frame for providing illumination towards an underneath of the awning. For the sake of easy assembling and disassembling, the central post frame usually comprises an upper post and a lower post, which is arranged to detachably couple with the upper post so that a user is able to disassemble the outdoor umbrella by detaching the lower post from the upper post. Conversely, when the user is assembling the outdoor umbrella, he/she can couple the lower post to the upper post for suspendedly supporting the awning frame at a top portion of the upper post.

In order to provide electric supply to the illumination system while maintaining the detachable feature of the outdoor umbrella, the outdoor umbrella typically comprises a light wiring system comprising a power plug and a power socket mounted on upper post and the lower post respectively, wherein the power plug is electrically connected with the illumination system, and the power socket is electrically connected to an external power supply via a electric wire. As a result, when the upper post is coupled to the lower post for assembling of the main supporting frame, the power plug is arranged to be electrically coupled with the power socket for conducting electrically from the external power supply to the illumination system.

A main problem for this conventional outdoor umbrella is that secure connection between the power plug and the power socket is difficult to achieve so that the illumination system may not have continuous supply of power to provide continuous illumination for the users standing or sitting under the awning. The situation is especially daunting if the outdoor umbrella is set up in a windy environment and during night time. For example, when the outdoor umbrella is subject to strong wind and vibrates, the connection between the power plug and power socket may not be secure enough so that electrical supply to the illumination system may lose.

Another problem for the conventional light wiring system is that it is not generally durable. More specifically, the connection between the power plug and the power socket and the main supporting frame looses very easily so that the power plug or the power socket may detach from the main supporting frame and the outdoor umbrellas can on longer be assembled properly.

SUMMARY OF THE PRESENT INVENTION

A main object of the present invention is to provide an outdoor umbrella comprising an illumination wiring arrangement which is capable of maintaining a secure electrical supply to an illumination system mounted on the outdoor umbrella even though the outdoor umbrella is used in a windy environment.

Another object of the present invention is to provide an outdoor umbrella comprising an illumination wiring arrangement which allows for easy disassembling or assembling of the outdoor umbrella while maintaining secure electric supply to the illumination system whenever the outdoor umbrella is assembled and set up for use.

Another object of the present invention is to provide an outdoor umbrella comprising an illumination wiring arrangement, which is adapted to accommodate and supplement the operation of a wide variety of illumination systems, such as a solar energy illumination system, so as to facilitate a widespread application of the present invention.

Another object of the present invention is to provide an outdoor umbrella comprising an illumination wiring arrangement which does not involve complicated or expensive mechanical or electrical components so as to minimize the manufacturing cost as well as the ultimate selling price of the present invention.

Accordingly, in order to accomplish the above objects, the present invention provides an outdoor umbrella, comprising:

an awning;

a main frame comprising a tubular first post having a first connector end, a tubular second post having a second connector end detachably coupling with the first connector end of the first post in an end-to-end manner to form an elongated supporting post, and an awning supporting frame provided on top of the supporting post to support the awning to define a shading area thereunder;

an illumination system provided on the main frame for illuminating the shading area of the awning; and an illumination wiring arrangement, which comprises:

a first wiring unit comprising a connector plug provided at the first connector end of the first post to electrically connect to the illumination system; and a second wiring unit comprising a power socket which is electrically extended from a power source and is extended through the second post at the second connector end thereof to electrically connect to the connector plug, wherein when the first post is coupled with the second post, the power socket is free to move within the second post to keep intact an electrical connection between the power socket and the connector plug so as to ensure the illumination system electrically connecting with the power source through the illumination wiring arrangement when vibration occurs at the main frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
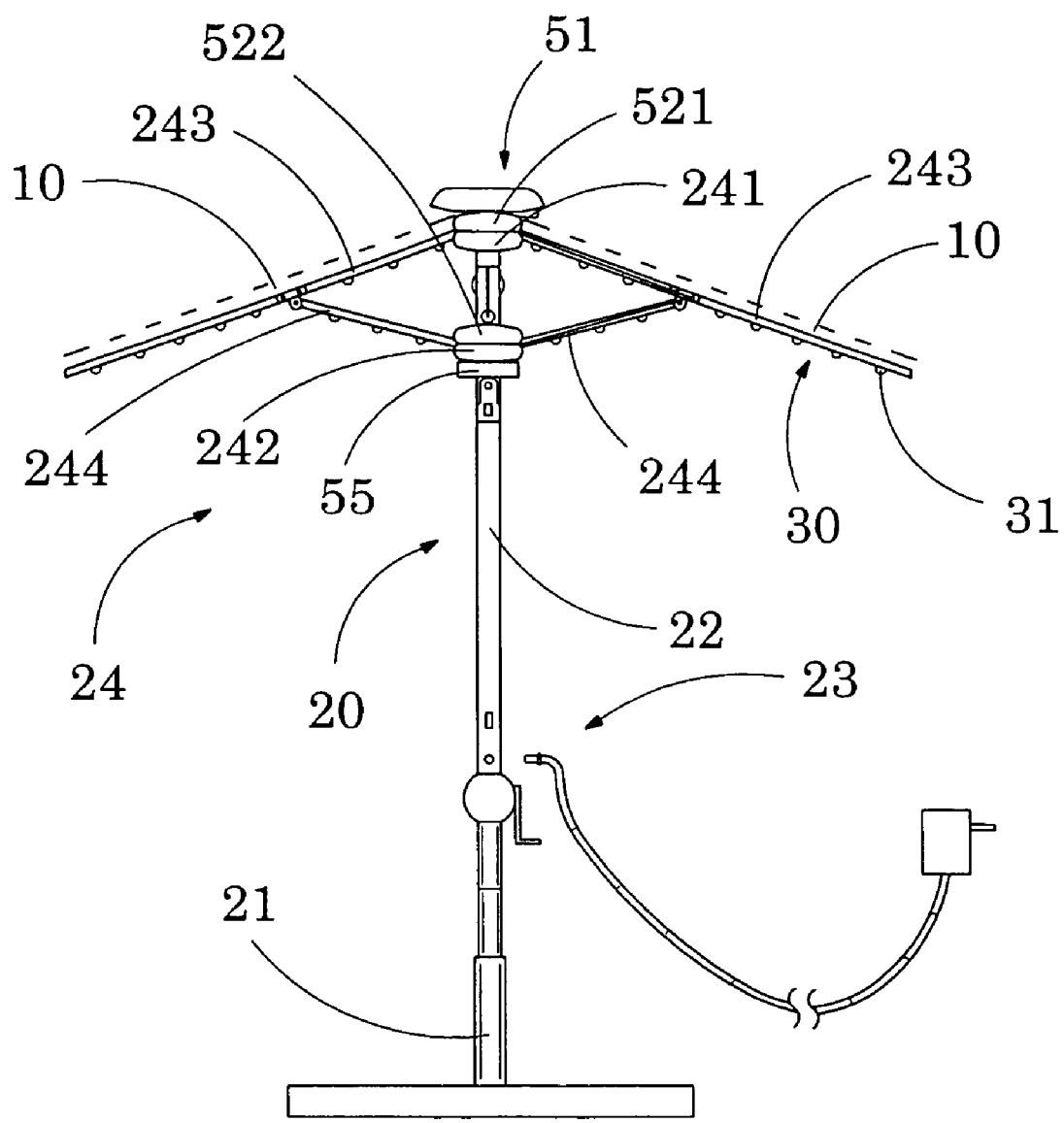
FIG. 1 is a side view of an outdoor umbrella according to a preferred embodiment of the present invention, illustrating that the illumination system is powered by a rechargeable battery.
Figure 2:
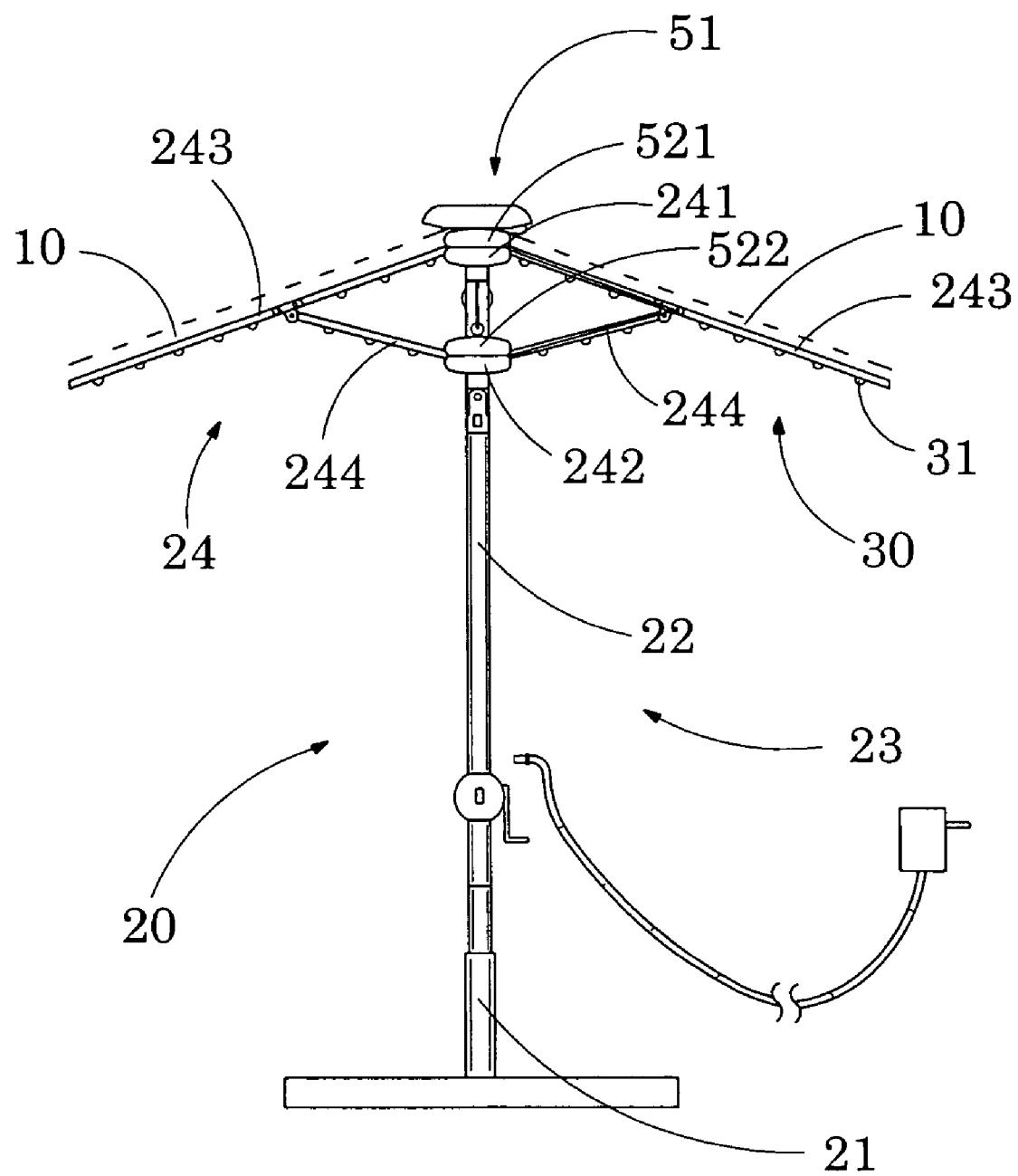
FIG. 2 is a side view of the outdoor umbrella according to the above preferred embodiment of the present invention.
Figure 4:
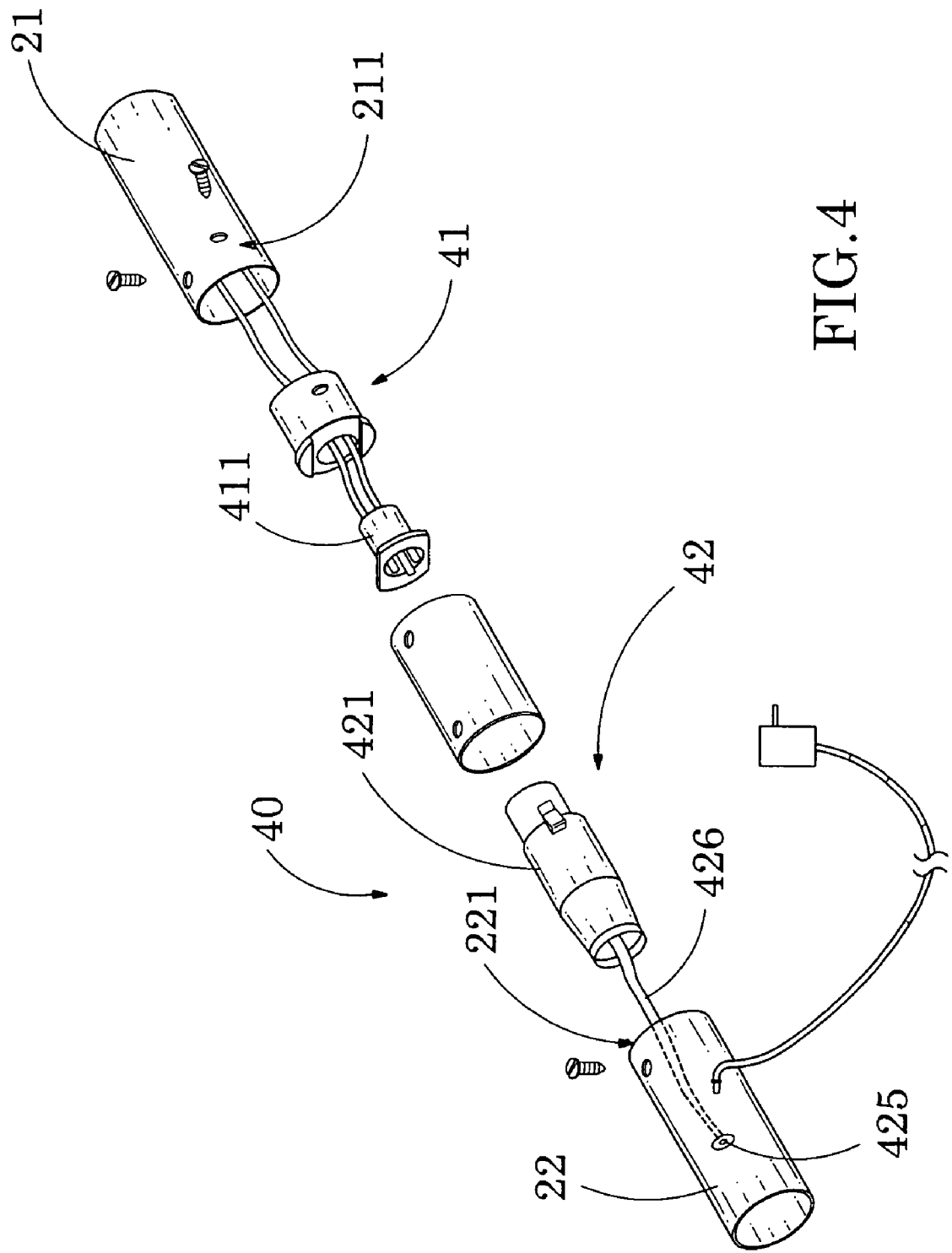
FIG. 4 is an exploded perspective view of the light wiring arrangement according to the above preferred embodiment of the present invention.
Figure 5:
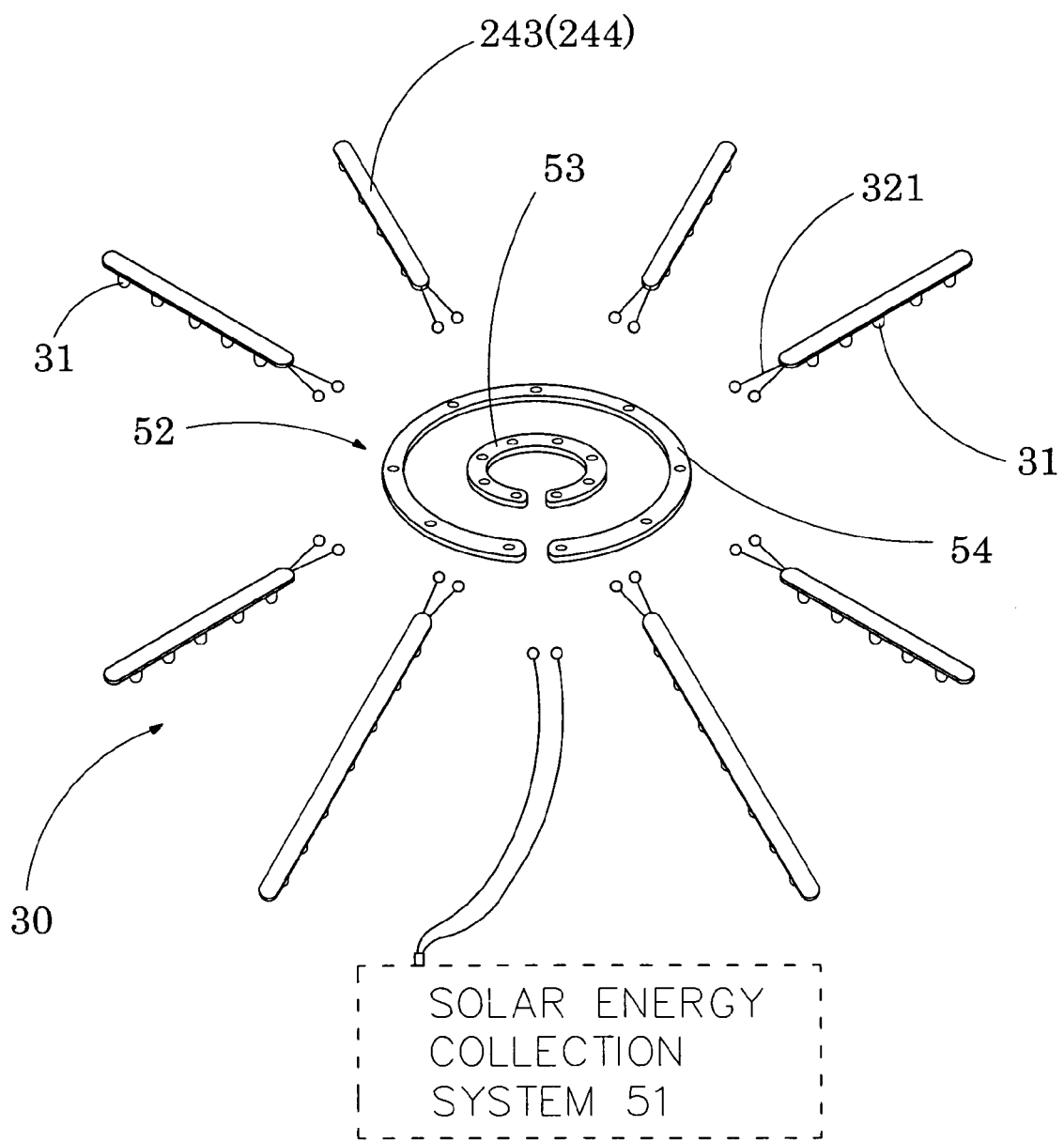
FIG. 5 is an exploded perspective view of the illumination system according to the above preferred embodiment of the present invention.
Figure 6:
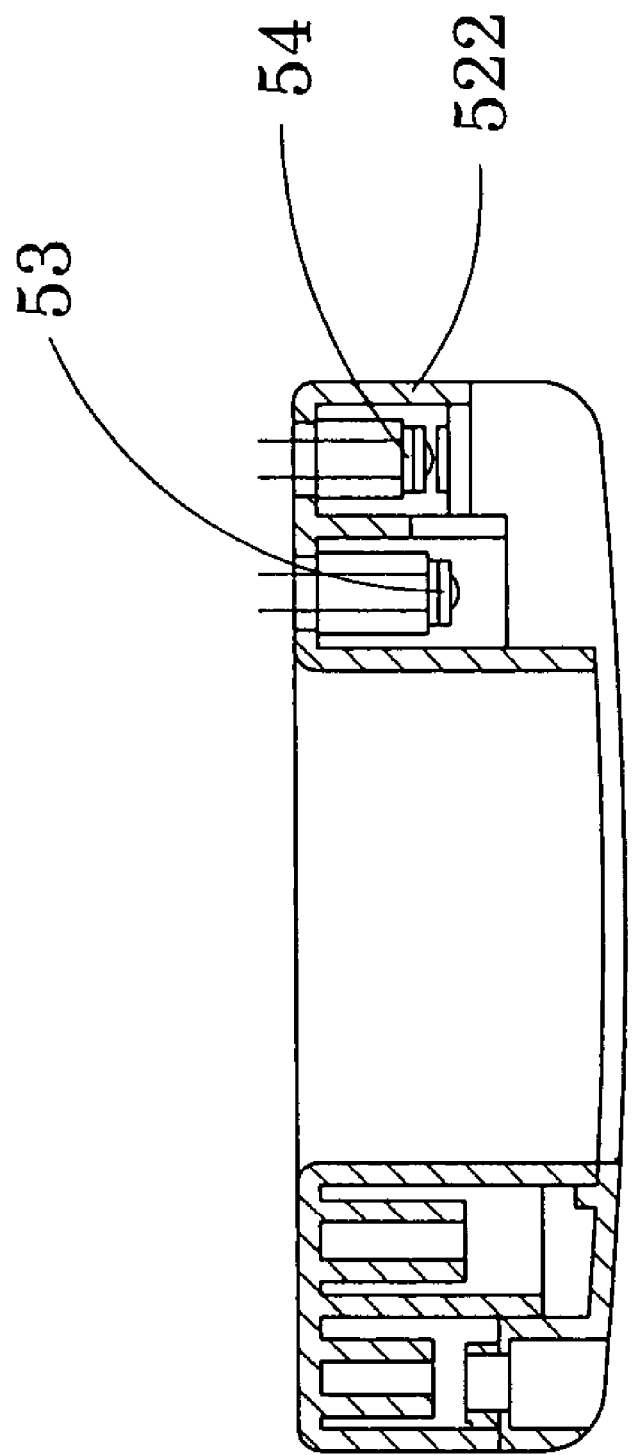
FIG. 6 is a sectional side view of the upper power hub according to the above preferred embodiment of the present invention.
Figure 7:
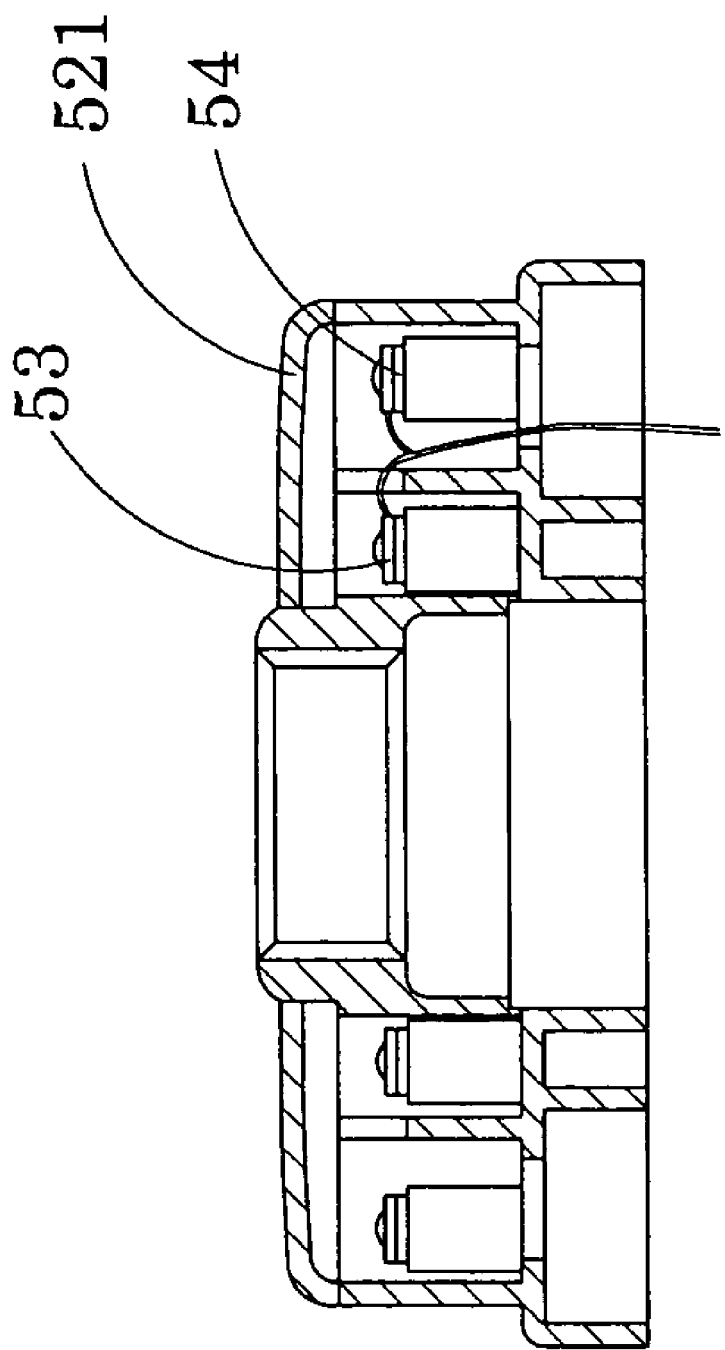
FIG. 7 is a sectional side view of the lower power hub according to the above preferred embodiment of the present invention.

Referring to FIG. 1, FIG. 2 and FIG. 4 of the drawings, an outdoor umbrella according to a preferred embodiment of the present invention is illustrated. According to the preferred embodiment of the present invention, the outdoor umbrella comprises an awning 10, a main frame 20, an illumination system 30, and an illumination wiring arrangement 40.

The main frame 20 comprises a tubular first post 21 having a first connector end 211, a tubular second post 22 having a second connector end 221 detachably coupling with the first connector end 211 of the first post 21 in an end-to-end manner to form an elongated supporting post 23, and an awning supporting frame 24 provided on top of the supporting post 23 to support the awning 10 to define a shading area thereunder. Moreover, the illumination system 30 is provided on the main frame 20 for illuminating the shading area of the awning 10.

Referring to FIG. 4 of the drawings, the illumination wiring arrangement 40 comprises a first wiring unit 41 and a second wiring unit 42, wherein the first wiring unit 41 comprises a connector plug 411 provided at the first connector end 211 of the first post 21 to electrically connect to the illumination system 30.

On the other hand, the second wiring unit 42 comprises a power socket 421 which is electrically extended from a power source and is extended through the second post 22 at the second connector end 221 thereof to electrically connect to the connector plug 411, wherein when the first post 21 is coupled with the second post 22, the power socket 421 is free to move within the second post 22 to keep an electrical connection between the power socket 421 and the connector plug 411 intact so as to ensure the illumination system 30 electrically connecting with the power source through the illumination wiring arrangement 40 when vibration occurs at the main frame 20.

According to the preferred embodiment of the present invention, the second wiring unit 42 is directly connected with the external power source without directly connecting with the second post 22 so that when the outdoor umbrella is subject to vibration (say when the outdoor umbrella is set up in a windy environment), the vibration of second post 22 will not transmit to the power socket 421 so that the connection between the power socket 421 and the connector plug 411 can be kept intact.

Moreover, the second wiring unit 42 further comprises a power outlet 425 provided on an outer peripheral side of the second post 22 for electrically connecting to the power source and an electric wire 426 electrically extended from the power outlet 425 to the power socket 421 through an interior of the second post 22 such that the power socket 421 is freely slid within the interior of the second post 22 to electrically connect to the connector plug 411.

As a result, the electric wire 426 has a predetermined length longer than a distance between the power socket 421 and the second connector end 221 of the second post 22 so as to allow the power socket 421 pulling out from the second connector end 221 of the second post 22 to electrically connect to the connector plug 411 of the first wiring unit 41.

Referring to FIG. 1 and FIG. 2 of the drawings, the awning supporting frame 24 comprises a central housing which comprises an upper housing 241 affixed on top of second post 22, a lower housing 242 slidably connected to the second post 22 at a position underneath the upper housing 241, a plurality of awning arms 243 radially and pivotally extended from the upper housing 241 to support the awning 10 thereon, and a plurality of awning ribs 244 pivotally connecting the lower housing 242 with the awing arms 243 respectively in such a manner that when the lower housing 242 is slid along the second post 22 towards the upper housing 241, the awning arms 243 are pivotally driven by the awning ribs 244 to foldably and radially extended from the upper housing 241 so as to provide the shading area under the awning 10.

Figure 3A:
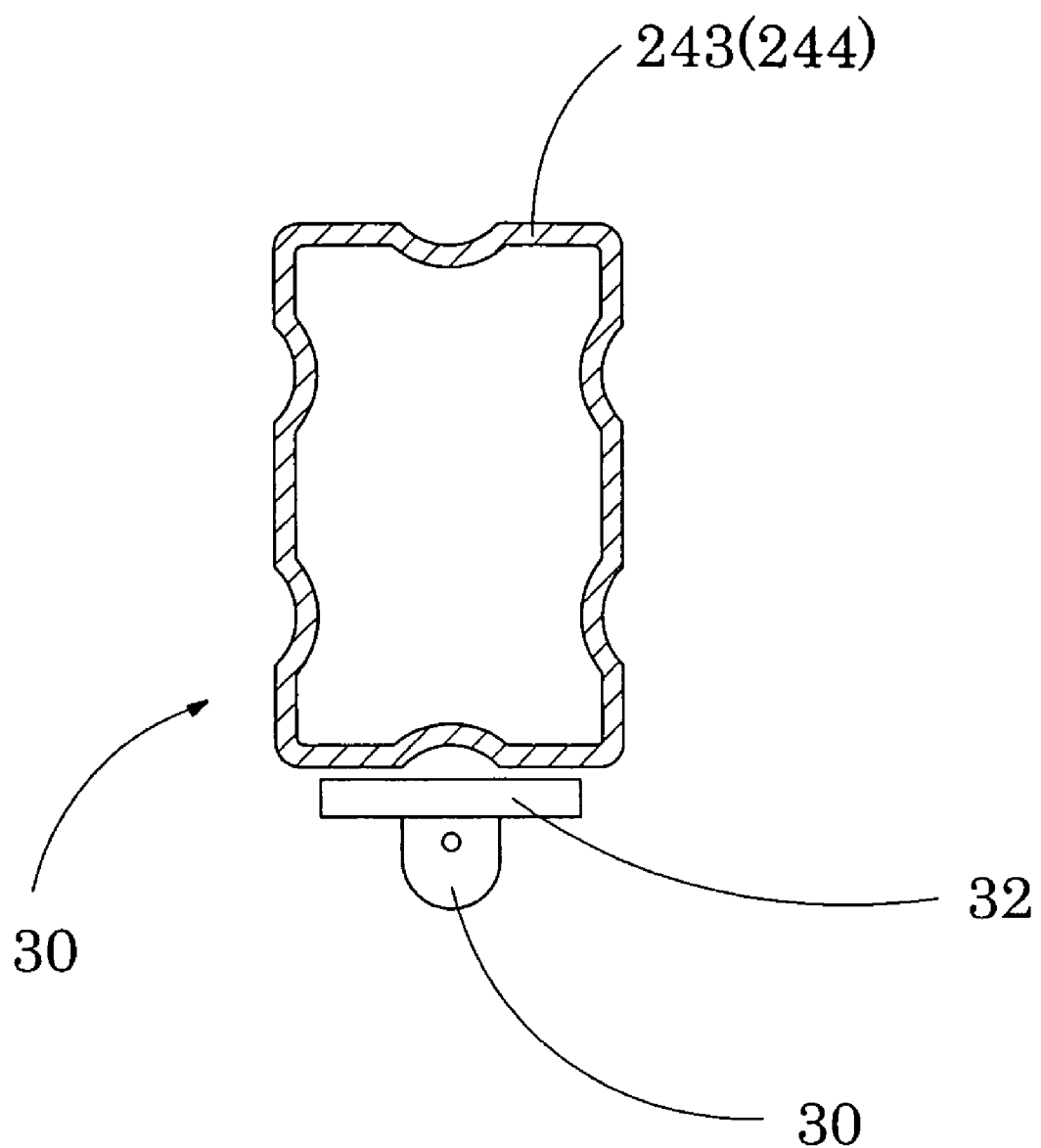
FIG. 3A and FIG. 3B are respectively a sectional side view and a front view of the illumination system according to the above preferred embodiment of the present invention.
Figure 3B:
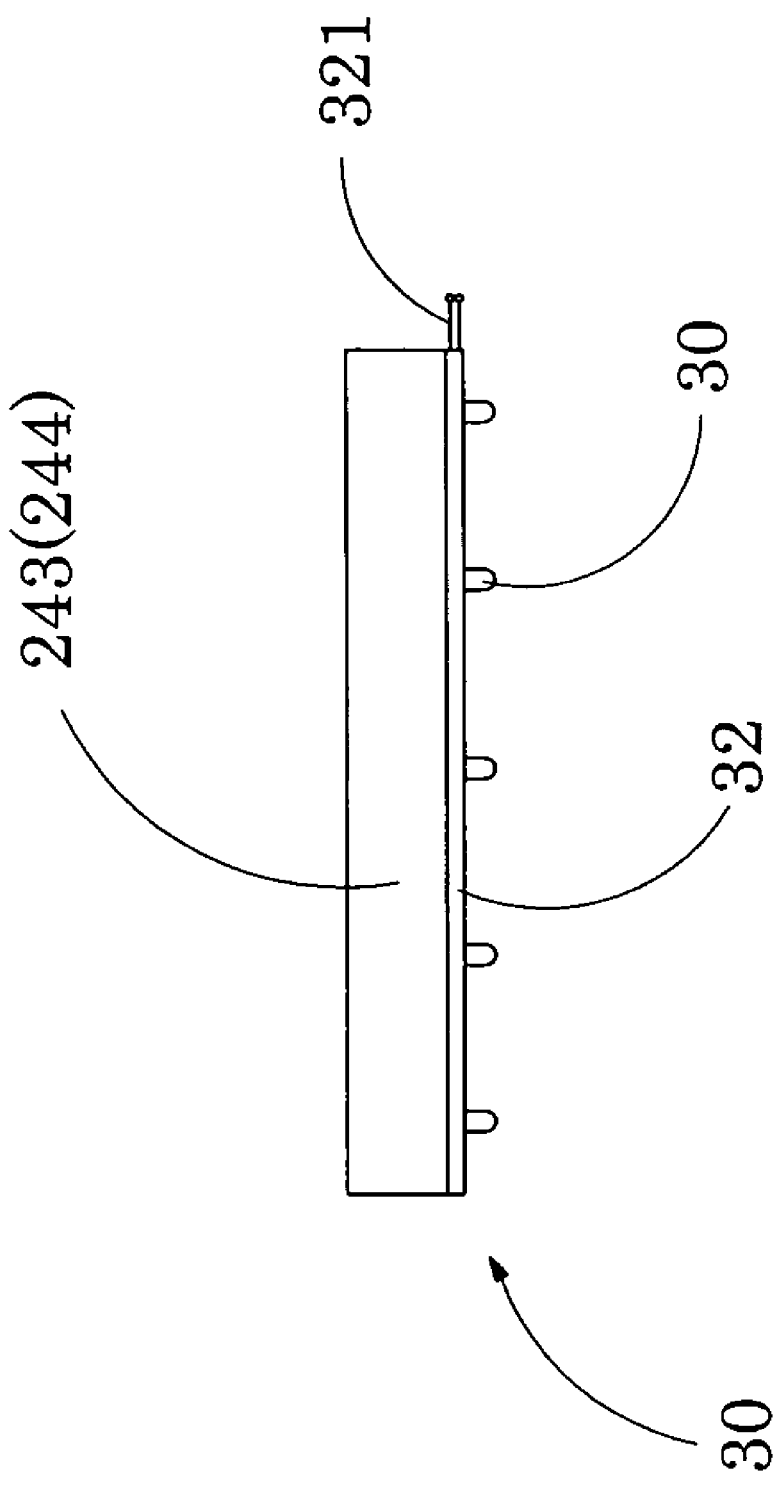

The illumination system 30 comprises a plurality of illuminators 31 preferably embodied as Light Emitting Diodes (LEDs) mounted on the awning supporting frame 24 for providing illumination to the shading area. Referring to FIG. 3A and FIG. 3B of the drawings, the illumination system 30 further comprises a plurality of connection wires 32, each having a positive and a negative end terminal 321, mounted along the awning arms 243 and the awning ribs 244 of the awning supporting frame 24 respectively, wherein the illuminators 31 are spacedly supported by and electrically connected with the connection wires 32 on the awning arms 243 and the awning ribs 244 for providing illumination along the awning arms 243 and the awning ribs 244 so as to light up the shading area underneath the awning 10.

Referring to FIG. 5 to FIG. 9 of the drawings, the outdoor umbrella further comprises a powering system 50 comprising a solar energy collection system 51 provided on top of the main frame 20 for collecting solar energy for lighting up the illuminators 31. The illumination system 30 further comprises a power distribution system 52 provided on the main frame 20 to electrically connect with the illuminators 31 so as to light up the illuminators 31. The power distribution system 52 comprises an upper power hub 521 and a lower power hub 522 provided on the upper housing 241 and the lower housing 242 respectively for electrically connecting between the illumination system 30 and the solar energy collection system 51 in such a manner that electrical power gathered by the solar energy collection system 51 is conducted to the illumination system 30 via the upper power hub 521 and the lower power hub 522.

Each of the upper power hub 521 and the lower power hub 522 comprises a plurality of positive terminal connectors 53 and a plurality of negative terminal connectors 54 each of which is electrically connected to the corresponding positive end terminal 321 and the negative end terminal 321 of the connection wire 32 of the illumination system 30 respectively, wherein the upper power hub 521 and the lower power hub 522 are electrically connected with the solar energy collection system 51 so that solar energy collected thereby can be transmitted to the connection wires 32 via the upper and the lower power hub 521, 522 for lighting up the illuminators 31.

According to the preferred embodiment of the present invention, the connection wires 32 mounting the illuminators 31 on the awning ribs 244 are electrically connected with the lower power hub 522 whereas the connection wires 32 mounting the illuminators 31 on the awning arms 243 are electrically connected with the upper power hub 521.

Figure 8:
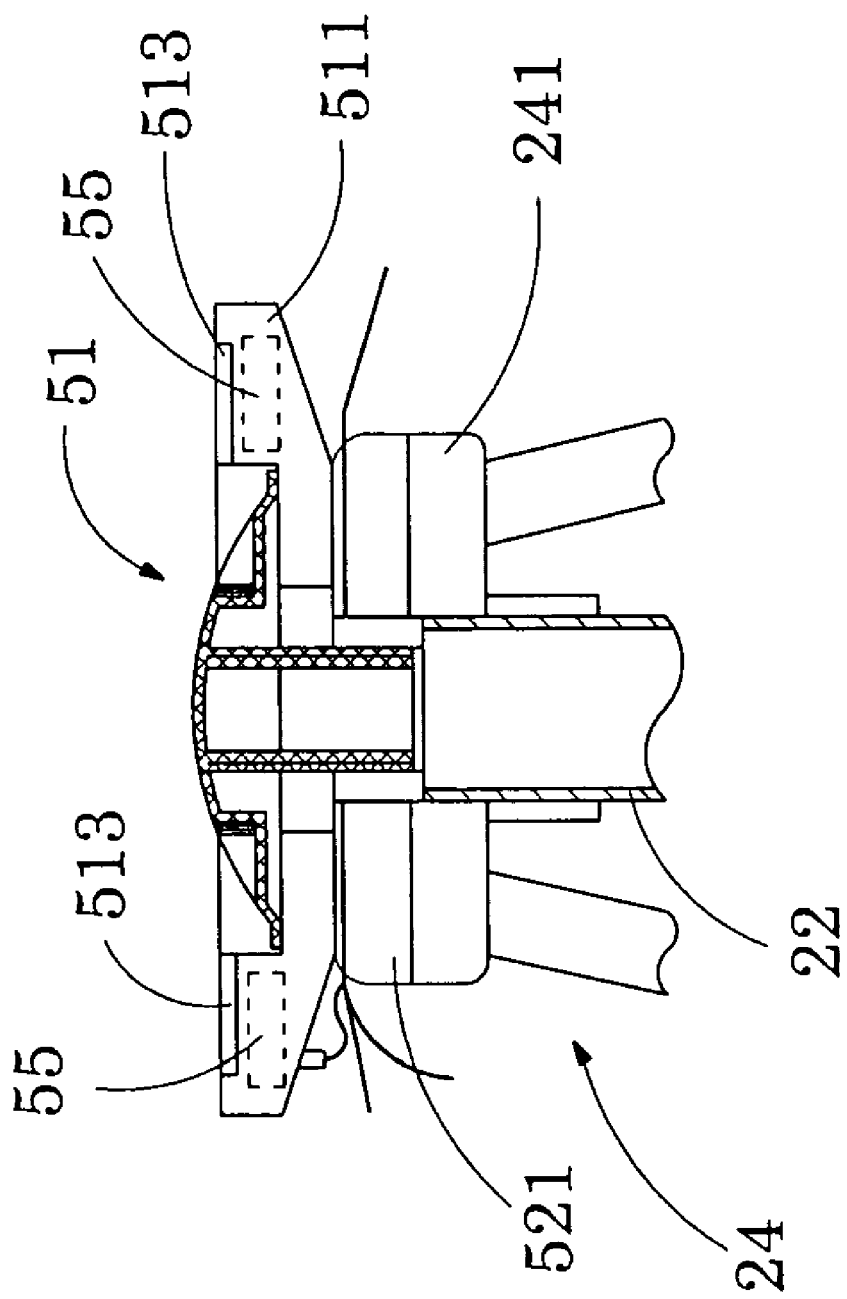
FIG. 8 is a sectional side view of the solar energy collection system according to the above preferred embodiment of the present invention.

Referring to FIG. 8 of the drawings, the solar energy collection system 51 comprises a solar energy housing 511 mounted on the upper housing 241 of the awning supporting frame 24, a collector holder 512 supported on the solar energy housing 511, and a solar energy collector 513 supported by the solar energy housing 511. The solar energy collector 513 is arranged to collect solar energy from natural sunshine and convert the solar energy into electrical energy so as to transmit the electrical energy to the upper power hub 521 and the lower power hub 522 for lighting up the illuminators 31.

Figure 9:
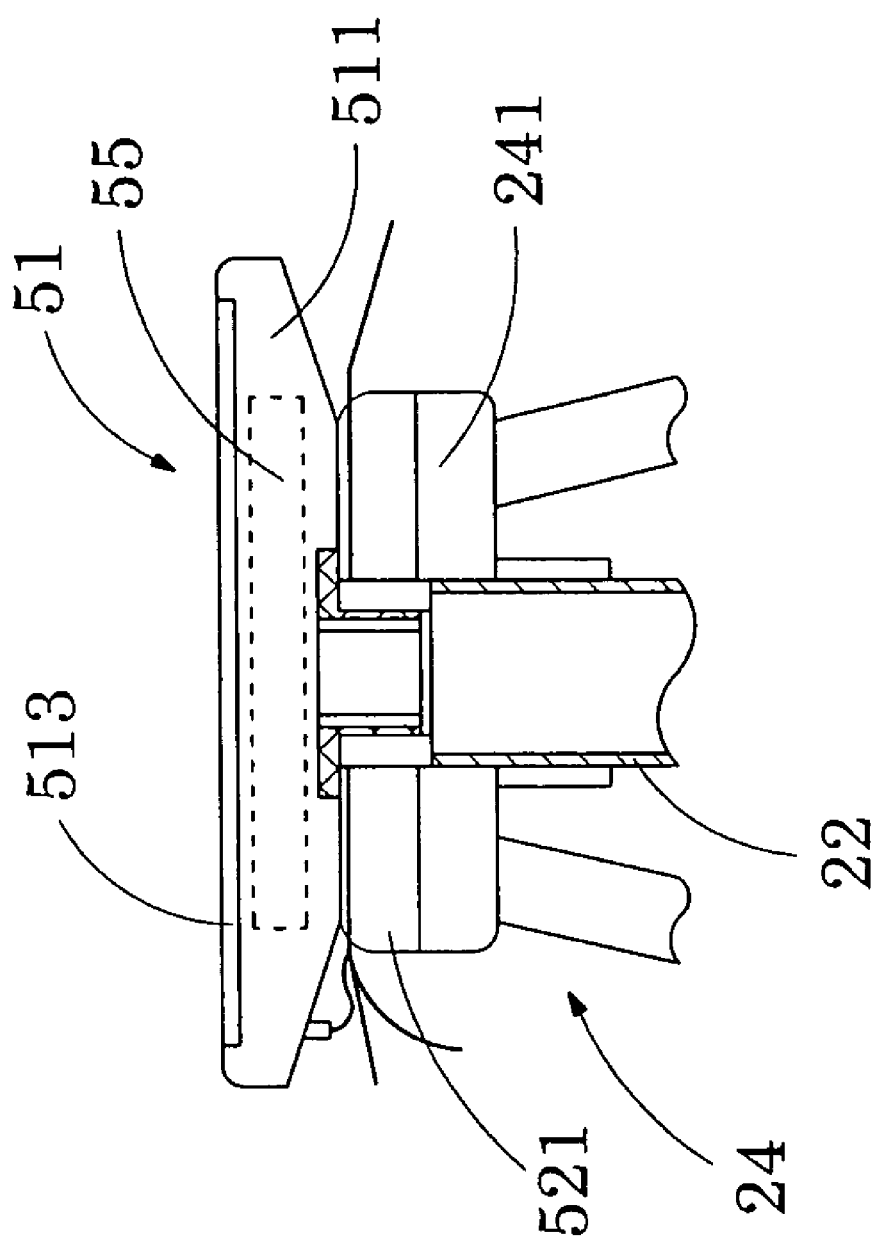
FIG. 9 is an alternative mode of the solar energy collection system according to the above preferred embodiment of the present invention.

As shown in FIG. 8 to FIG. 9 of the drawings, the solar energy collector 513 is preferably embodied as a conventional solar energy collection board having a planar structure and a top solar energy collection surface which is arranged to be exposed to sunlight for collecting an optimal amount of solar energy. The solar energy collector 513 may be embodied as two solar energy collection boards mounted on two side portions of the collector holder 512 for collecting solar energy.

Referring to FIG. 1 of the drawings, the powering system 50 further comprises a rechargeable battery unit 55 supported on the main frame 20 and electrically connected with the illumination system 30 for providing electricity to light up the illuminators 31 when the solar energy collection system 51 is incapable of continuously supplying solar energy to the illumination system 30. According to the preferred embodiment of the present invention, the rechargeable battery unit 55 is embodied as a rechargeable battery mounted on the main frame 20 to electrically connect with the solar energy collection system 51 in such a manner that the solar energy collected therefrom is transmitted to the rechargeable battery for charging it up so as to reserve the electrical power for further use (e.g. during night time). Alternatively, as shown in FIG. 8 and FIG. 9 of the drawings, the rechargeable battery 55 may instead be provided in the solar energy housing 511.

Figure 10A:
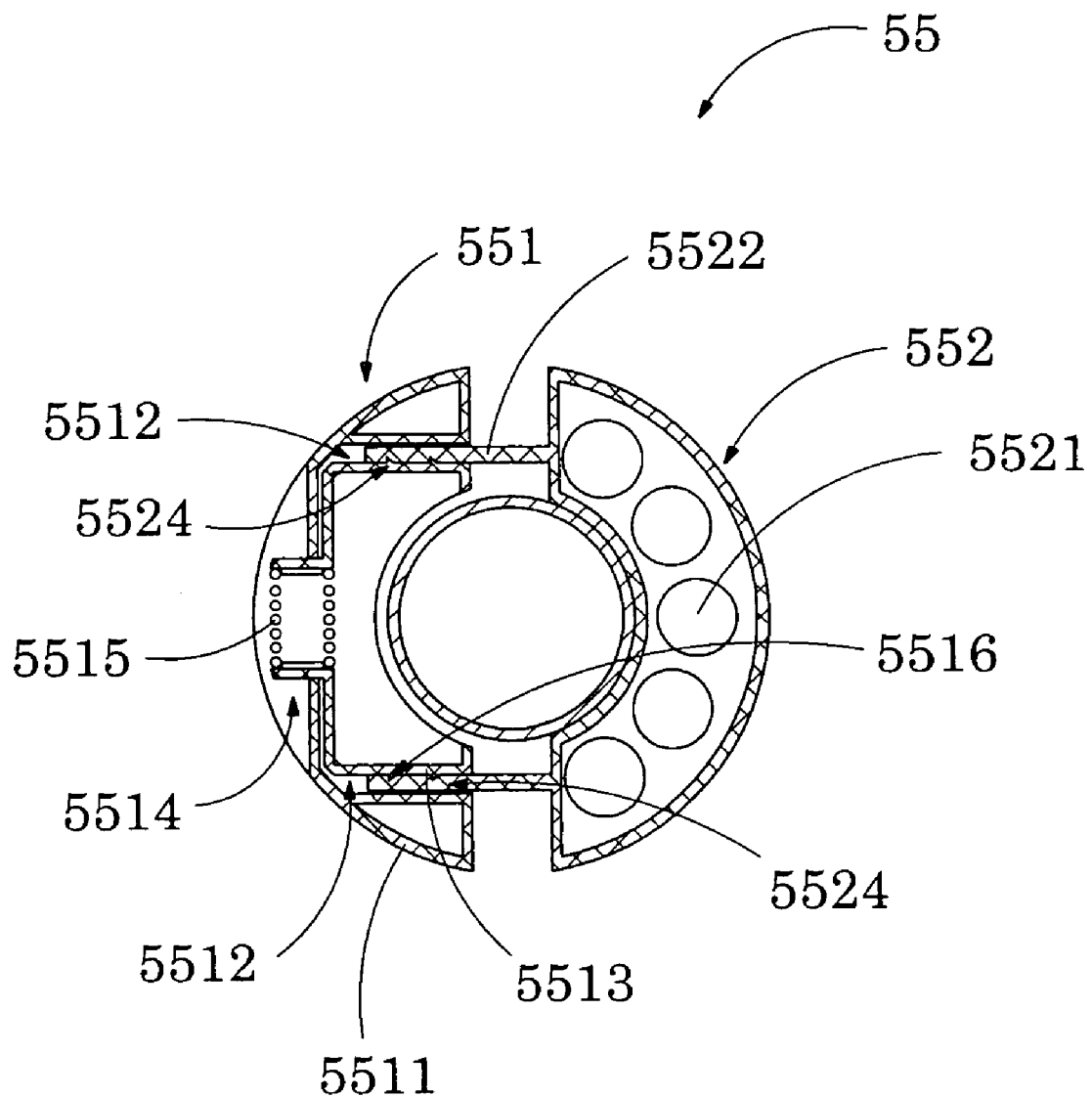
FIG. 10A and FIG. 10B are alternative mode of the rechargeable battery unit according to the above preferred embodiment of the present invention.
Figure 10B:
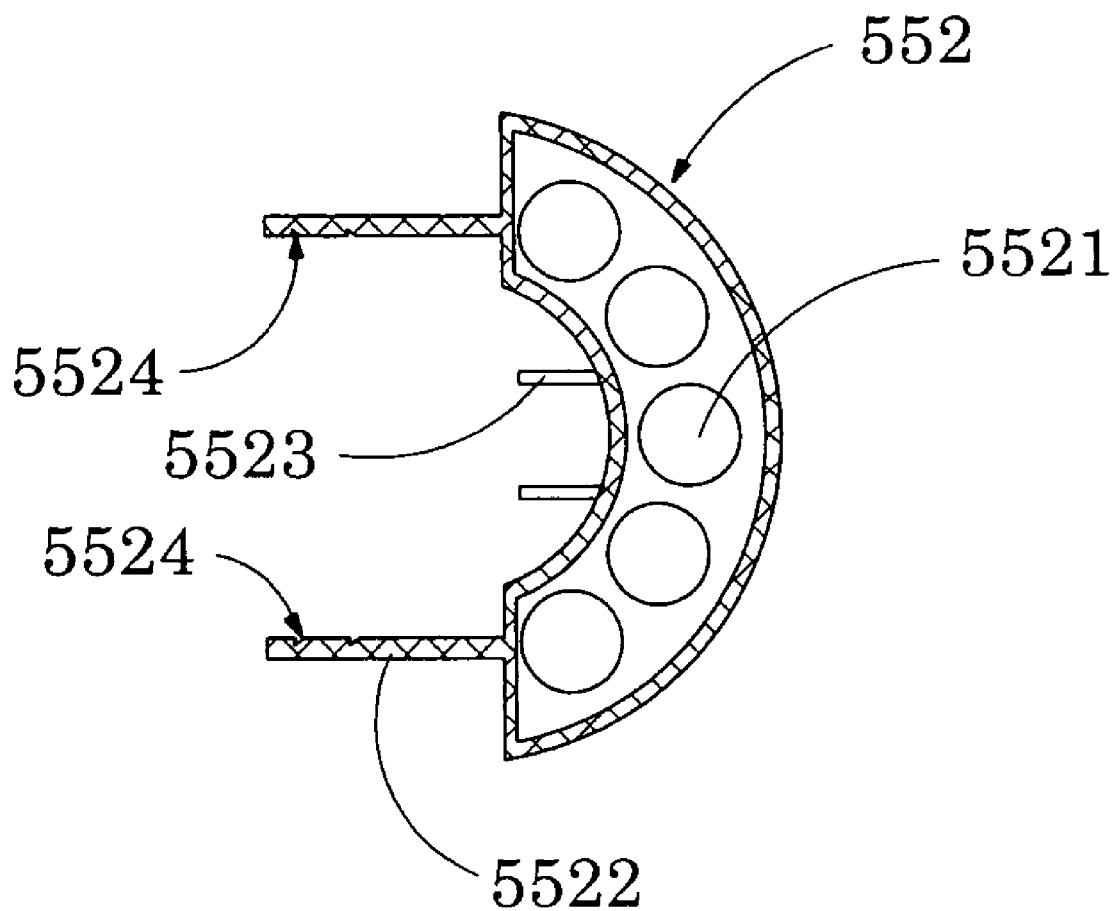

Referring to FIG. 10A to FIG. 10B of the drawings, as an alternative of the rechargeable battery unit 55, the rechargeable battery unit 55 comprises a rechargeable battery station 551 mounted at the main frame 20 and electrically connected with the solar energy collection system 51, and a battery control housing 552, adapted for receiving a plurality of rechargeable batteries 5521, detachably and electrically coupled with the rechargeable battery station 551 to electrically connect with the solar energy collection system 51 in such a manner that when the solar energy collection system 51 is collecting solar energy during daytime, a predetermined portion of electrical energy converted from the solar energy is transmitted to the rechargeable battery unit 55 for charging up the rechargeable batteries 5521 so as to reserve electrical energy for future use by the illumination system 30 when the outdoor umbrella is utilized during nighttime. In other words, the rechargeable battery unit 55 provides an alternative energy source for lighting up the illumination system 30.

Alternatively, the rechargeable battery unit 55 may also be connected with the illumination wiring arrangement 40 so that the rechargeable battery unit 55 is capable of being recharged by the external power source via the illumination wiring arrangement 40.

The rechargeable battery station 551 comprises an outer casing 5511 which has two spacedly apart securing slots 5512 formed therein, wherein each of the securing slots 5512 is defined by two sidewalls 5513 formed in the outer casing 5511. The outer casing 5511 further has an actuation portion 5514 transversely and integrally extended from the sidewalls 5513 of the securing slots 5512, wherein a resilient element 5515 is mounted at the actuation portion 5514 for normally exerting an urging force thereto. Moreover, the rechargeable battery station 551 further has a plurality of engaging teeth 5516 formed on the sidewalls 5513 of the securing slots 5512 for engaging with the battery control housing 552.

On the other hand, the battery control housing 552 has a rechargeable plug 5523 and two engaging members 5522 shaped and sized to correspond with the securing slots 5512 of the rechargeable battery station 551, wherein the engaging members 5522 are arranged to detachably insert into the securing slots 5512 respectively so as to detachably attach the battery control housing 552 to the rechargeable battery station 551. The battery control housing 552 further has a plurality of attachment teeth 5524 formed on the engaging members 5522 in such a manner that when the engaging members 5522 are inserted into the securing slots 5512 respectively, the attachment teeth 5524 is adapted to engage with the engaging teeth 5516 so that the battery control housing 552 is attached to the rechargeable battery station 551. It is worth mentioning that the resilient element 5515 normally exerts an urging force to the sidewalls 5513 of the securing slots 5512 for biasing against the engaging members 5522 for ensuring a sound engagement between the battery control housing 552 and the rechargeable battery station 551. In order to detach the battery control housing 552 from the rechargeable battery station 551, the actuation portion 5514 should be slightly depressed so that the securing slots 5512 are slightly pulled to distort for disengaging the attachment teeth 5524 from the engaging teeth 5516. Accordingly, the battery control housing 552 is capable of detaching from the rechargeable battery station 551.

Figure 11:
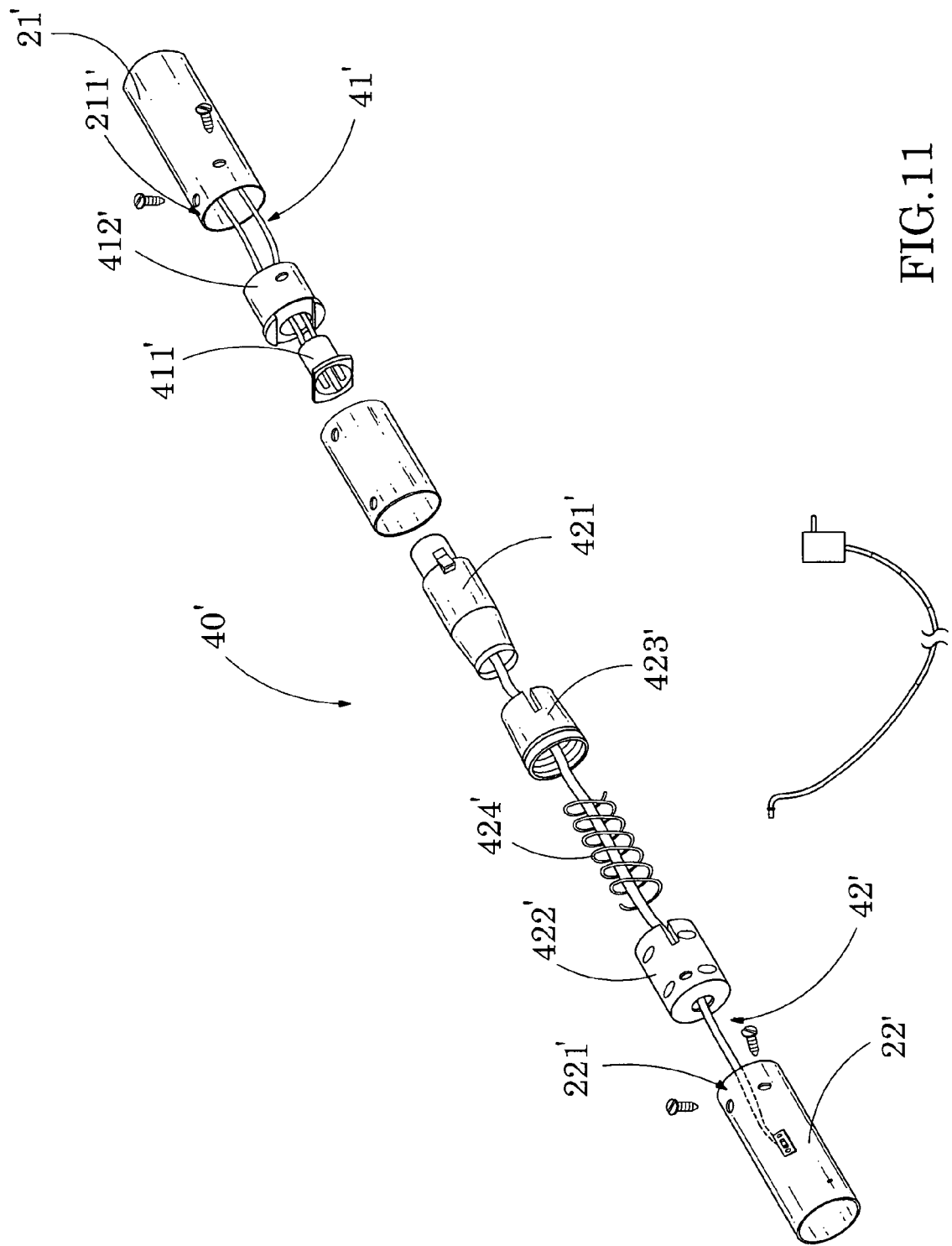
FIG. 11 is a first alternative mode of the outdoor umbrella according to the above preferred embodiment of the present invention.

Referring to FIG. 11 of the drawings, a first alternative mode of the outdoor umbrella according to the above preferred embodiment is illustrated. The first alternative mode is similar to the preferred embodiment except the illumination wiring arrangement 40'. According to the first alternative mode, the illumination wiring arrangement 40' comprises a first wiring unit 41' and a second wiring unit 42', wherein the first wiring unit 41' comprises a connector plug 411' provided at the first connector end 211' of the first post 21' to electrically connect to the illumination system 30.

On the other hand, the second wiring unit 42' comprises a power socket 421' which is electrically extended from a power source and is extended through the second post 22' at the second connector end 221' thereof to electrically connect to the connector plug 411', wherein when the first post 21' is coupled with the second post 22', the power socket 421' is free to move within the second post 22' to keep an electrical connection between the power socket 421' and the connector plug 411' intact so as to ensure the illumination system 30 electrically connecting with the power source through the illumination wiring arrangement 40' when vibration occurs at the main frame 10.

Moreover, the first wiring unit 41' further comprises a plug holder 412' mounting between the first connector end 211' of the first post 21' and the connector plug 411' for securely mounting the connector plug 411' with the first connector end 211' of the first post 21'. In other words, the plug holder 412' also substantially provides firm support to the connector plug 411' when the first post 21' and the second post 22' are connected to form the main frame 20', so as to securely retain the connector plug 411' thereat to electrically connect to the power socket 421'.

On the other hand, the second wiring unit 42' further comprises a supporting seat 422' securely mounted at the second connector end 221' of the second post 22', a socket holder 423' movably mounted with the supporting seat 422', and a suspension element 424' mounted at the socket holder 423' to normally exert a biasing force against the power socket 421' which is attached on the socket holder 423'. Accordingly, when the power socket 421' is electrically connected with the connector plug 411', and when the outdoor umbrella is subject to vibration, the suspension element 424' is arranged to act as a vibration absorber for substantially mitigating the vibration induced at the power socket 421' and the connector plug 411' so as to maintain a sound connection between the power socket 421' and the connector plug 411'. Thus, the suspension element 424' is substantially supported at the supporting seat 422' for applying an urging force against the power socket 421' towards the connector plug 411' for not only absorbing the vibration induced at the power socket 421' but also ensuring the connector plug 411' being electrically connected with the power socket 421'.

The socket holder 423' is securely holding the power socket 421' at a position that the suspension element 424' is disposed between the supporting seat 422' and the socket holder 423' such that when the first connector end 211' of the first post 21' is connected to the second connector end 221' of the second post 22', the suspension element 424' is compressed between the supporting seat 422' and the socket holder 423' for pushing the power socket 421' towards the connector plug 411'.

Moreover, the suspension element 424' comprises a compression spring, which is coaxially supported within the second post 22', having two ends substantially biasing against the supporting seat 422' and the power socket 421' such that the compression spring not only acts as a vibration absorber for substantially absorbing the vibration induced at the power socket 421' when the vibration occurs at the main frame 20 but also ensures that the connector plug 411' being electrically connected with the power socket 421' when the compression spring pushes the power socket 421' towards the connector plug 411'.

Figure 12A:
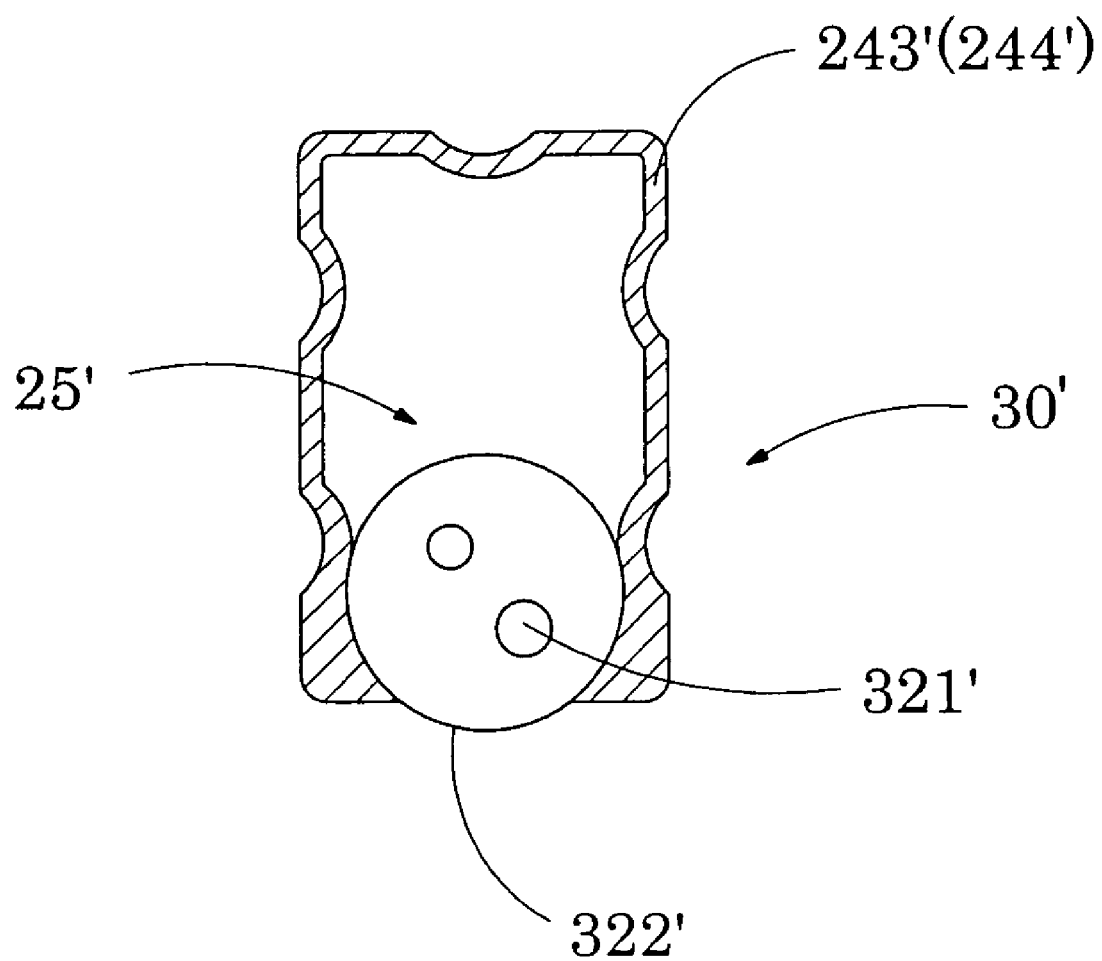
FIG. 12A and FIG. 12B are schematic diagrams of the illumination system according to the first alternative mode of the present invention.
Figure 12B:
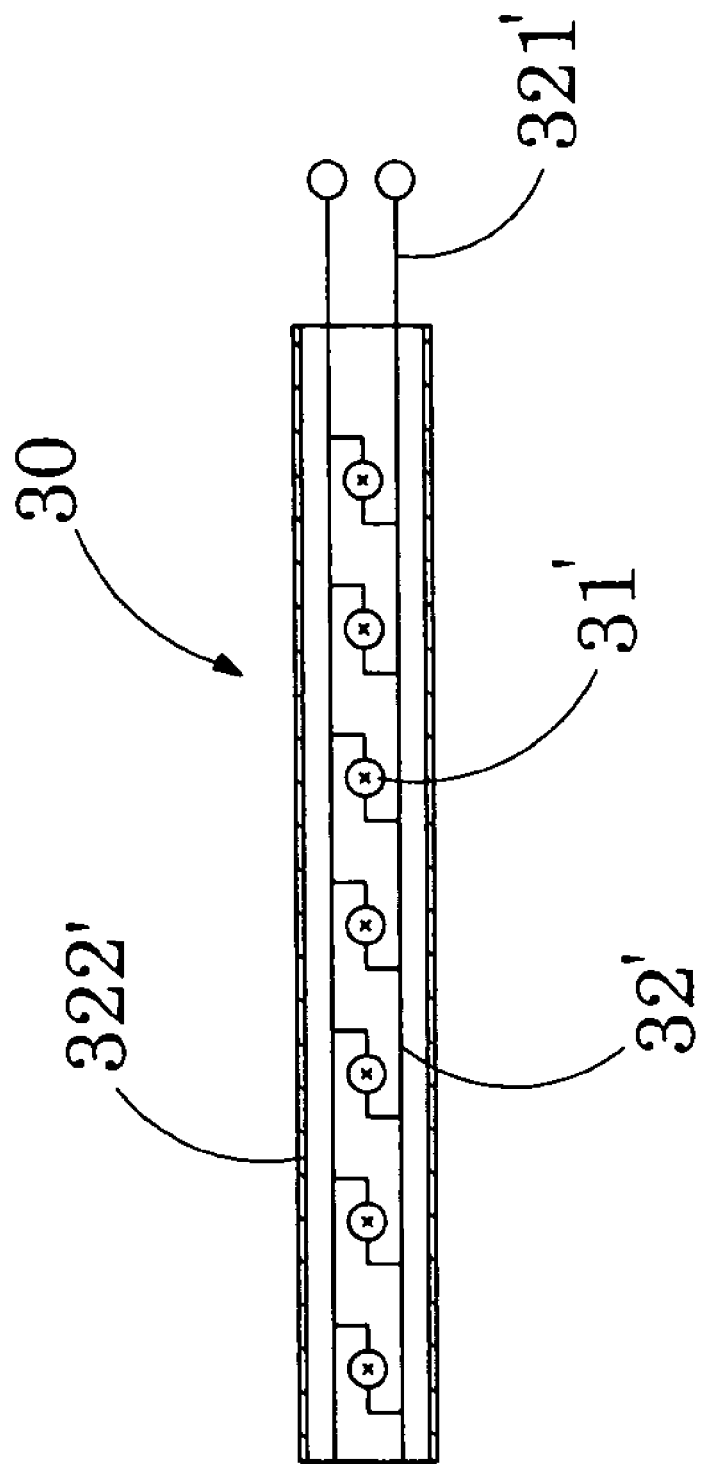

Referring to FIG. 12A and FIG. 12B of the drawings, the illumination system 30' comprises a protective light tube 322' mounted on the awning arms 243' and the awning ribs 244' respectively, a plurality of connection wires 32', each having a positive and a negative end terminal 321', mounted within the respective protective light tube 322', wherein the illuminators 31' are spacedly mounted along the connection wires 32' within the respective protective light tube 322' for providing illumination along the awning arms 243' and the awning ribs 244' so as to light up the shading area underneath the awning 10.

In order to achieve secure mounting of the protective light tubes 322', each of the awning arms 243' and the awning ribs 244' has a mounting slot 25' indently formed alone the awning arm 243' or the awning rib 244' wherein the protective light tubes 322' are securely mounted in the mounting slots 25' respectively so as to mount the illuminators 31' on the awning arms 243' or the awning ribs 244'.

Figure 13A:
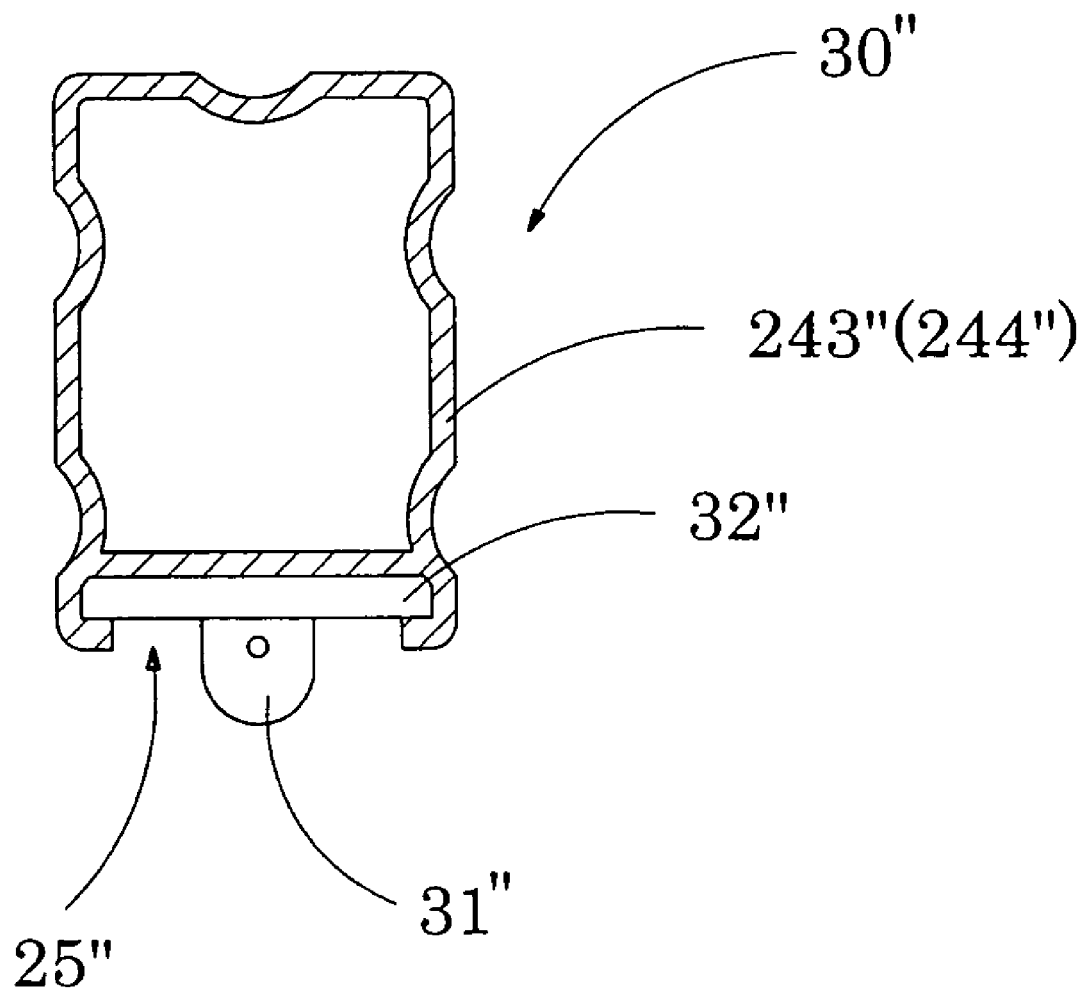
FIG. 13A and FIG. 13B are schematic diagrams of the illumination system according to a second alternative mode of the present invention.
Figure 13B:
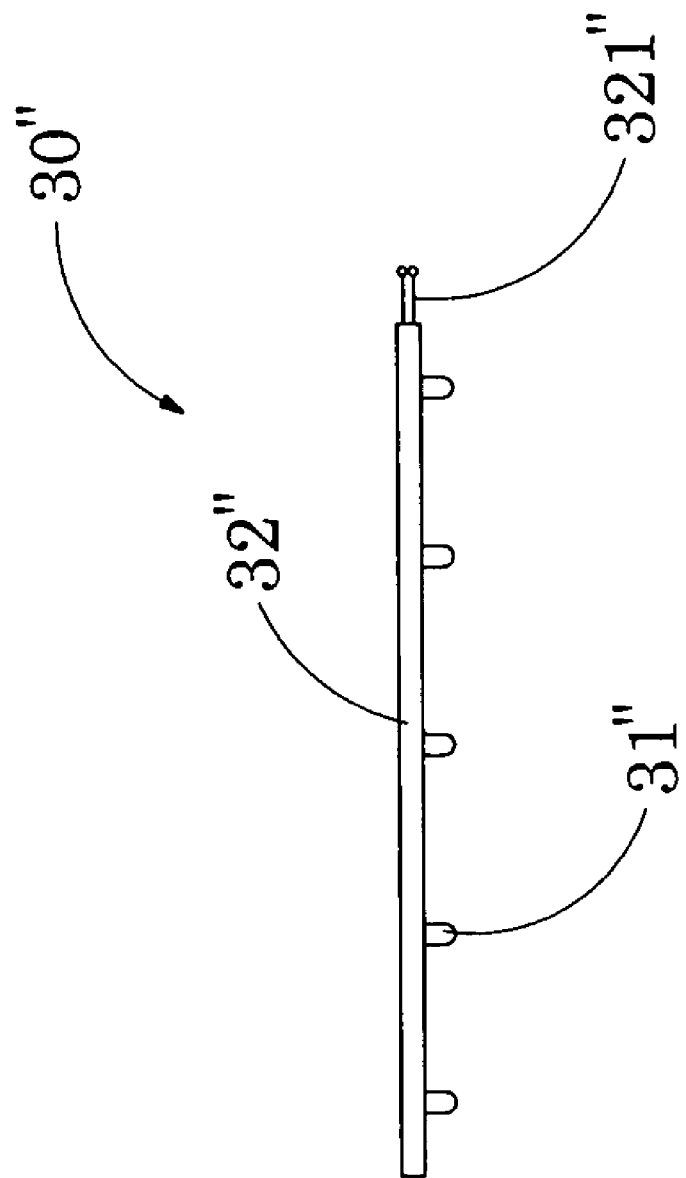

Referring FIG. 13A and FIG. 13B of the drawings, a second alternative mode of the outdoor umbrella according to the above preferred embodiment is illustrated. The second alternative mode is similar to the preferred embodiment except the illumination system 30". According to the second alternative mode, the illumination system 30" further comprises a plurality of connection wires 32", each having a positive and a negative end terminal 321", mounted along the awning arms 243" and the awning ribs 244" of the awning supporting frame 24 respectively, wherein the illuminators 31" are spacedly supported by and electrically connected with the connection wires 32" on the awning arms 243" and the awning ribs 244" for providing illumination along the awning arms 243" and the awning ribs 244" so as to light up the shading area underneath the awning 10.

In order to achieve secure mounting of the connection wires 32", each of the awning arms 243" and the awning ribs 244" has an elongated mounting slot 25" indently formed alone the awning arm 243" or the awning rib 244" wherein the connection wires 32" are securely mounted within the mounting slots 25" respectively so as to mount the illuminators 31" on the awning arms 243" or the awning ribs 244".

Figure 14A:
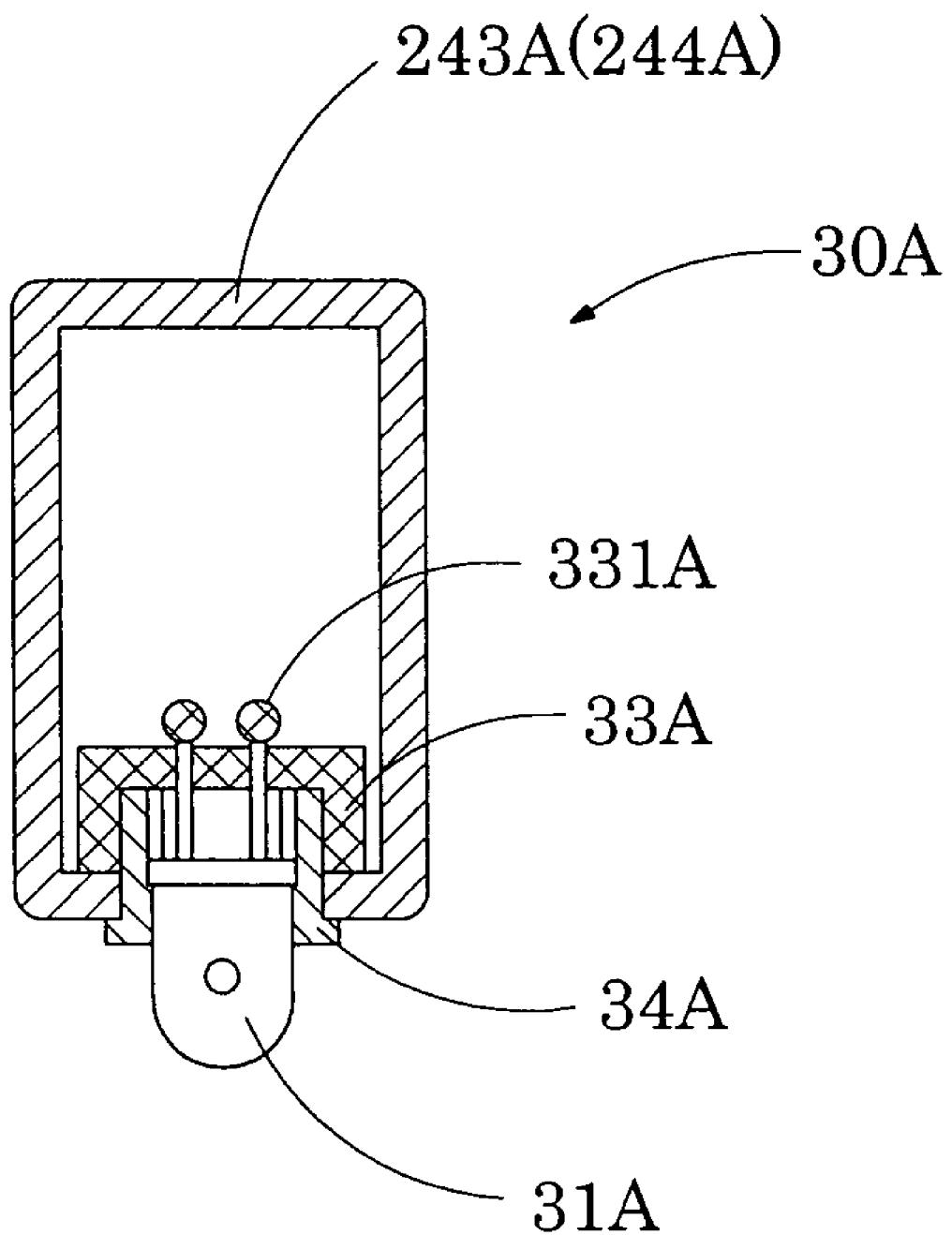
FIG. 14A and FIG. 14B are schematic diagrams of the illumination system according to a third alternative mode of the present invention.
Figure 14B:
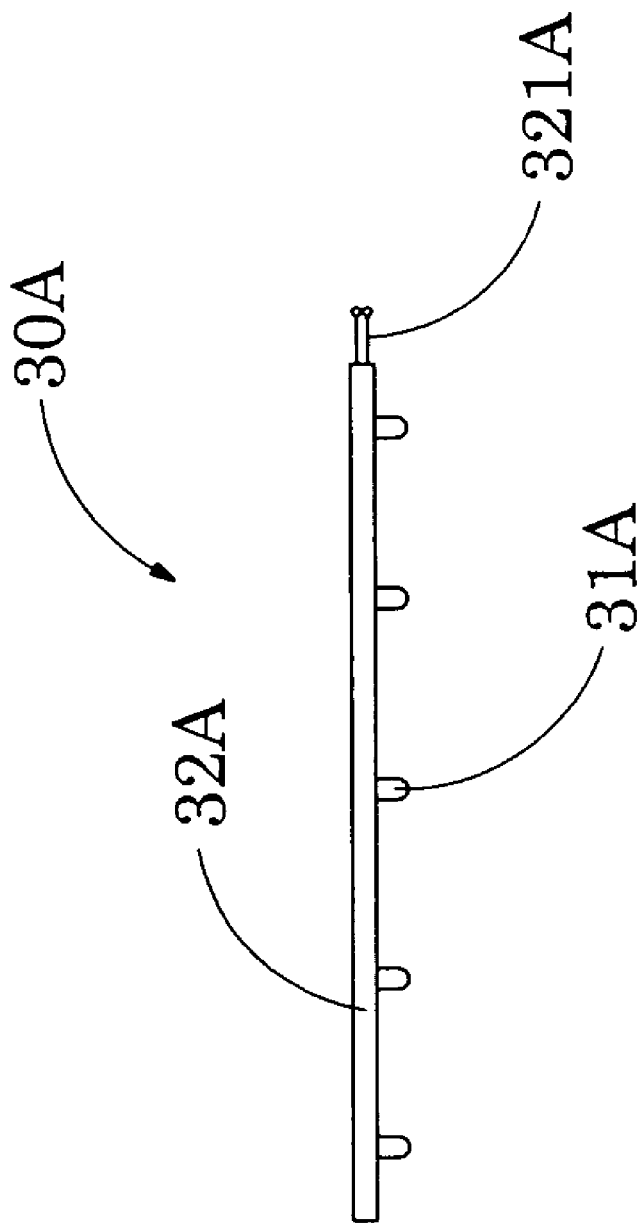

Referring FIG. 14A and FIG. 14B of the drawings, a third alternative mode of the outdoor umbrella according to the above preferred embodiment is illustrated. The third alternative mode is similar to the preferred embodiment except the illumination system 30A. According to the third alternative mode, the illumination system 30A comprises a plurality of connection wires 32A, each having a positive and a negative end terminal 321A, mounted along the awning arms 243A and the awning ribs 244A of the awning supporting frame 24 respectively, wherein the illuminators 31A are spacedly supported by and electrically connected with the connection wires 32A on the awning arms 243A and the awning ribs 244A for providing illumination along the awning arms 243A and the awning ribs 244A so as to light up the shading area underneath the awning 10.

The illumination system 30A further comprises a plurality of elongated supporting holders 33A, and a plurality of illuminators housings 34A, wherein each of the supporting holders 33A has a plurality of terminal connectors 331A adapted for electrically connected with the powering system 50 of the outdoor umbrella. The illuminators housings 34A are mounted on the supporting holders 33A respectively, whereas the supporting holders 33A are mounted on the awning arms 243A and the awning ribs 244A respectively. Accordingly, the illuminators 31A are mounted within the illuminators housings 34A respectively to electrically connect with the respective terminal connector 331A so as to electrically connect with the powering system 50. As a result, each of the illuminators 31A are mounted on the awning arms 243A or the awning ribs 244A and electrically connected with the powering system 50 via the respective supporting holder 33A and the illuminators housing 34A.

From the forgoing descriptions, it can be shown that the above objects have been substantially accomplished. The present invention provides an outdoor umbrella comprising the illumination wiring arrangement 40 which is capable of maintaining a secure electrical supply to an illumination system 30 mounted on the outdoor umbrella even though the outdoor umbrella is used in a windy environment.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An outdoor umbrella, comprising:
an awning;
a main frame comprising a tubular first post having a first connector end, a tubular second post having a second connector end detachably coupling with said first connector end of said first post in an end-to-end manner to form an elongated supporting post, and an awning supporting frame provided on top of said supporting post to support said awning to define a shading area thereunder;
an illumination system provided on said main frame for illuminating said shading area of said awning; and
an illumination wiring arrangement, which comprises:
a first wiring unit comprising a connector plug provided within said first connector end of said first post to electrically connect to said illumination system; and
a second wiring unit comprising a power socket which is electrically extended from a power source and is extended within said second post at said second connector end thereof in a suspended manner to electrically connect to said connector plug in a detachably connecting manner, wherein when said first post is coupled with said second post, said power socket is free to move within said second post to keep intact an electrical connection between said power socket and said connector plug so as to ensure said illumination system electrically connecting with said power source through said illumination wiring arrangement when vibration occurs at said main frame,
wherein said illumination wiring arrangement further comprises a supporting seat securely mounted at said second connector end of said second post and a suspension element substantially supported at said supporting seat for applying an urging force against said power socket towards said connector plug for not only absorbing said vibration induced at said power socket but also ensuring said connector plug being electrically connected with said power socket,
wherein said suspension element comprises a compression spring, which is coaxially supported within said second post, having two ends substantially biasing against said supporting seat and said power socket such that said compression spring not only acts as a vibration absorber for substantially absorbing said vibration induced at said power socket when said vibration occurs at said main frame but also ensures said connector plug being electrically connected with said power socket when said compression spring pushes said power socket towards said connector plug.

2. The outdoor umbrella, as recited in claim 1, wherein said awning supporting frame comprises a central housing affixed on top of said first post and a plurality of awning arms radially extended from said central housing to support said awning thereon, wherein said illumination system comprises a power distribution system which is disposed within said central housing and is electrically connected with said connector plug, and a plurality of illuminators spacedly mounted along each of said awning arms to electrically couple with said power distribution system, such that when said connector plug is electrically connected to said power socket, said illuminators are adapted for illuminating said shading area under said awning.

3. The outdoor umbrella, as recited in claim 2, wherein each of said awning supporting arms has an indent and elongated mounting slot, wherein said illuminators are spacedly received in said mounting slots for illuminating said shading area under said awning.

4. An outdoor umbrella, comprising:
an awning;
a main frame comprising a tubular first post having a first connector end, a tubular second post having a second connector end detachably coupling with said first connector end of said first post in an end-to-end manner to form an elongated supporting post, and an awning supporting frame provided on top of said supporting post to support said awning to define a shading area thereunder;
an illumination system provided on said main frame for illuminating said shading area of said awning; and
an illumination wiring arrangement, which comprises:
a first wiring unit comprising a connector plug provided within said first connector end of said first post to electrically connect to said illumination system; and
a second wiring unit comprising a power socket which is electrically extended from a power source and is extended within said second post at said second connector end thereof in a suspended manner to electrically connect to said connector plug in a detachably connecting manner, wherein when said first cost is coupled with said second post, said power socket is free to move within said second post to keep intact an electrical connection between said power socket and said connector plug so as to ensure said illumination system electrically connecting with said power source through said illumination wiring arrangement when vibration occurs at said main frame,
wherein said second wiring unit further comprises a power outlet provided on an outer peripheral side of said second post for electrically connecting to said power source and an electric wire electrically extended from said power outlet to said power socket through an interior of said second post such that said power socket is freely slid within said interior of said second post to electrically connect to said connector plug,
wherein said illumination wiring arrangement further comprises a supporting seat securely mounted at said second connector end of said second post and a suspension element substantially supported at said supporting seat for applying an urging force against said power socket towards said connector plug for not only absorbing said vibration induced at said power socket but also ensuring said connector plug being electrically connected with said power socket,
wherein said suspension element comprises a compression spring, which is coaxially supported within said second post, having two ends substantially biasing against said supporting seat and said power socket such that said compression spring not only acts as a vibration absorber for substantially absorbing said vibration induced at said power socket when said vibration occurs at said main frame but also ensures said connector plug being electrically connected with said power socket when said compression spring pushes said power socket towards said connector plug.

5. An outdoor umbrella, comprising:
an awning;
a main frame comprising a tubular first post having a first connector end, a tubular second post having a second connector end detachably coupling with said first connector end of said first post in an end-to-end manner to form an elongated supporting post, and an awning supporting frame provided on top of said supporting post to support said awning to define a shading area thereunder;

an illumination system provided on said main frame for illuminating said shading area of said awning; and an illumination wiring arrangement, which comprises:

a first wiring unit comprising a connector plug provided within said first connector end of said first post to electrically connect to said illumination system; and a second wiring unit comprising a power socket which is electrically extended from a power source and is extended within said second post at said second connector end thereof in a suspended manner to electrically connect to said connector plug in a detachably connecting manner, wherein when said first post is coupled with said second post, said power socket is free to move within said second post to keep intact an electrical connection between said power socket and said connector plug so as to ensure said illumination system electrically connecting with said power source through said illumination wiring arrangement when vibration occurs at said main frame, wherein said second wiring unit further comprises a power outlet provided on an outer peripheral side of said second post for electrically connecting to said power source and an electric wire electrically extended from said power outlet to said power socket through an interior of said second post such that said power socket is freely slid within said interior of said second post to electrically connect to said connector plug, wherein said electric wire has a predetermined length longer than a distance between said power socket and said second connector end of said second post so as to allow said power socket pulling out from said second connector end of said second post to electrically connect to said connector plug, wherein said illumination wiring arrangement further comprises a supporting seat securely mounted at said second connector end of said second post and a suspension element substantially supported at said supporting seat for applying an urging force against said power socket towards said connector plug for not only absorbing said vibration induced at said power socket but also ensuring said connector plug being electrically connected with said power socket, wherein said suspension element comprises a compression spring, which is coaxially supported within said second post, having two ends substantially biasing against said supporting seat and said power socket such that said compression spring not only acts as a vibration absorber for substantially absorbing said vibration induced at said power socket when said vibration occurs at said main frame but also ensures said connector plug being electrically connected with said power socket when said compression spring pushes said power socket towards said connector plug.

6. The outdoor umbrella, as recited in claim 5, wherein said illumination system further comprises a socket holder securely holding said power socket at a position that said suspension element is disposed between said supporting seat and said socket holder such that when said first connector end of said first post is connected to said second connector end of said second post, said suspension element is compressed between said supporting seat and said socket holder for pushing said power socket towards said connector plug.

7. The outdoor umbrella, as recited in claim 6, wherein said illumination system further comprises a plug holder substantially mounted at said first connector end of said first post to securely retain said connector plug thereat to electrically connect to said power socket.

8. The outdoor umbrella, as recited in claim 7, wherein said awning supporting frame comprises a central housing affixed on top of said first post and a plurality of awning arms radially extended from said central housing to support said awning thereon, wherein said illumination system comprises a power distribution system which is disposed within said central housing and is electrically connected with said connector plug, and a plurality of illuminators spacedly mounted along each of said awning arms to electrically couple with said power distribution system, such that when said connector plug is electrically connected to said power socket, said illuminators are adapted for illuminating said shading area under said awning.

9. The outdoor umbrella, as recited in claim 8, wherein each of said awning supporting arms has an indent and elongated mounting slot, wherein said illuminators are spacedly received in said mounting slots for illuminating said shading area under said awning.

10. The outdoor umbrella, as recited in claim 5, wherein said awning supporting frame comprises a central housing affixed on top of said first post and a plurality of awning arms radially extended from said central housing to support said awning thereon, wherein said illumination system comprises a power distribution system which is disposed within said central housing and is electrically connected with said connector plug, and a plurality of illuminators spacedly mounted along each of said awning arms to electrically couple with said power distribution system, such that when said connector plug is electrically connected to said power socket, said illuminators are adapted for illuminating said shading area under said awning.

11. The outdoor umbrella, as recited in claim 10, wherein each of said awning supporting arms has an indent and elongated mounting slot, wherein said illuminators are spacedly received in said mounting slots for illuminating said shading area under said awning.

* * * * *